United States Patent [19]

Piechowiak

[11] Patent Number: 4,784,409

[45] Date of Patent: Nov. 15, 1988

[54] POLYBUTYLENE PLUMBING FITTINGS AND METHOD AND APPARATUS FOR ASSEMBLY THEREOF

[76] Inventor: James T. Piechowiak, 819 Oakdale Dr., Elkhart, Ind. 46517

[21] Appl. No.: 688,358

[22] Filed: Jan. 2, 1985

[51] Int. Cl.⁴ .................... F16L 13/14; F16L 47/02
[52] U.S. Cl. .................................. 285/21; 156/73.5; 264/68; 285/423; 285/286
[58] Field of Search ............... 285/21, 423, 915, 286; 228/2, 112, 133, 154; 156/73.5

[56] References Cited

U.S. PATENT DOCUMENTS

| | | | |
|---|---|---|---|
| 2,169,315 | 8/1939 | Yngve | 156/73.5 |
| 2,819,883 | 1/1958 | Rieppel et al. | 257/256 |
| 2,819,884 | 1/1958 | Rieppel et al. | 257/256 |
| 2,874,942 | 2/1959 | Rieppel et al. | 257/256 |
| 2,882,588 | 4/1959 | Rieppel et al. | 257/256 |
| 2,933,428 | 4/1960 | Mueller | 156/73.5 |
| 2,942,748 | 6/1960 | Anderson | 264/68 |
| 3,002,871 | 10/1961 | Tramm et al. | 156/73 |
| 3,013,925 | 12/1961 | Larsen | 156/153 |
| 3,144,710 | 8/1964 | Hollander et al. | 228/112 |
| 3,351,512 | 11/1967 | Zelewsky et al. | 156/73.5 |
| 3,501,171 | 3/1970 | Baron | 285/52 |
| 3,562,078 | 2/1971 | Zumstein | 156/73.5 |
| 3,591,205 | 7/1971 | Hamburg | 285/81 |
| 3,633,944 | 1/1972 | Hamburg | 285/81 |
| 3,788,928 | 1/1974 | Wise | 285/21 |
| 3,813,708 | 6/1974 | Hamburg | 4/286 |
| 3,831,983 | 8/1974 | Stickler | 285/12 |
| 3,874,067 | 4/1975 | Toyooka et al. | 156/73.5 |
| 3,917,497 | 11/1975 | Stickler | 156/73.5 |
| 4,023,831 | 5/1977 | Thompson | 285/31 |
| 4,043,574 | 8/1977 | Asano | 285/21 |
| 4,047,739 | 9/1977 | Altken | 285/21 |
| 4,067,534 | 1/1978 | Frey | 285/423 |
| 4,078,764 | 3/1978 | Haffner | 251/175 |
| 4,119,334 | 10/1978 | Steed | 285/236 |
| 4,146,254 | 3/1979 | Turner | 285/331 |
| 4,165,104 | 8/1979 | Van Den Beld | 285/21 |
| 4,327,726 | 5/1982 | Kwong | 285/423 |
| 4,331,280 | 5/1982 | Terabayashi et al. | 228/2 |

FOREIGN PATENT DOCUMENTS

| | | | |
|---|---|---|---|
| 505815 | 12/1954 | Italy | 264/68 |
| 6401292 | 8/1965 | Netherlands | 285/21 |
| 7011090 | 1/1972 | Netherlands | 156/73.5 |
| 534328 | 1/1977 | U.S.S.R. | 228/112 |
| 551143 | 4/1977 | U.S.S.R. | 228/112 |
| 836442 | 6/1981 | U.S.S.R. | 285/915 |
| 1315719 | 5/1973 | United Kingdom | 285/21 |

Primary Examiner—Gary L. Smith
Assistant Examiner—Eric K. Nicholson
Attorney, Agent, or Firm—Barnes & Thornburg

[57] ABSTRACT

A plumbing construction is provided including a pipe, a fitting, and a bushing, each formed from polybutylene and providing a fluid-tight connection between the pipe and the fitting. The bushing is mounted about the pipe and an end of the pipe and the bushing is inserted into the fitting. The bushing is rotated with respect to the fitting to produce friction welds between the bushing and both the pipe and the bushing.

16 Claims, 2 Drawing Sheets

FIG. I

POLYBUTYLENE PLUMBING FITTINGS AND METHOD AND APPARATUS FOR ASSEMBLY THEREOF

BACKGROUND AND SUMMARY OF THE INVENTION

The present invention relates generally to fluid flow connections and, more particularly, to behind-the-wall plumbing constructions.

A wide variety of fittings and fixtures are available for connection to a fluid flow conduit or pipe in plumbing constructions. It is important that these constructions provide a reliable fluid tight seal, especially in behind-the-wall constructions where pipe-fitting connections are relatively inaccessible. It is also important these connections be made quickly and simply, especially in mobile home and modular housing constructions where production and component costs must be kept to a minimum.

In constructions where weight and cost have to be minimized, it has been suggested that various plastic fittings and pipes or combinations of metal and plastic fittings and pipes be employed. While these arrangements are typically acceptable in low pressure, exposed plumbing constructions, objections have been raised with respect to fire protection and behind-the-wall applications.

Many plumbing constructions using all plastic components fail to meet the high pressure rating standards required by the industry and government for use in behind-the-wall constructions. Plumbing constructions using metal/plastic combinations are typically mechanically joined and also fail to meet industry standards for behind-the-wall constructions. Those metal/plastic connections that do pass the ratings test are relatively expensive to produce. Some plastic component constructions are permissible for cold water and/or low pressure applications, but not for hot water and/or high pressure uses. Other plastic component constructions are acceptable only for non-portable or non-standing water systems. Thus, they are not suitable for residential plumbing and fire protection applications, respectively.

Polybutylene is a material which would be especially suitable for use in plumbing constructions. Polybutylene piping is sufficiently rigid and strong enough to pass even fire protection and behind-the-wall rating standards. Polybutylene may be quickly and inexpensively extruded into both tubing and pipe and molded into a wide variety of fittings and fixtures. This material also remains stable and retains its flexibility, shape and fluid flow integrity over a wide range of temperatures. Further, polybutylene is substantially chemically inert and, thus, is not subject to corrosion or deterioration in potable water application.

However, it has been extremely difficult to provide an adequate connection between polybutylene plumbing components, such as a pipe end and a T or L fitting. While polybutylene is chemically inert with respect to most corrosive materials, it is likewise inert with respect to adhesives. Polybutylene piping is usually also too soft to thread sufficiently to form a fluid-tight seal. Mechanical bonds, such as crimping a portion of polybutylene tubing to a fitting, are available, but often only at a prohibitive cost and requiring a restriction in the fluid-flow path. Also, crimping methods require significant amounts of working space and do not always produce reliable connections unless extreme care is taken in assembly. Heat fusion techniques, wherein individual components are heated and then pressed together, have not been altogether successful even where both components are polybutylene. Again, assembly techniques are critical and, on occasion, the polybutylene elements have been fused but without welding, and therefore have not remained fluid-tight up to the required pressure ratings. As a result, acceptable plumbing constructions formed entirely from polybutylene components have not achieved widespread commercial application.

It is therefore an object of the present invention to provide an improved plumbing construction.

Another object is the provision of an inexpensive and reliable tubular connection for fluid flow systems.

A further object is to provide a pipe-fitting connection formed entirely from polybutylene components.

Yet another object is the provision of a method of assembling polybutylene components into a fluid-tight construction suitable for behind-the-wall applications and an apparatus for friction welding a plurality of polybutylene elements simultaneously.

Still another object is to provide an inexpensive plastic-component plumbing construction suitable for use in fire protection applications.

These and other objects of the present invention are attained by the provision of a plumbing construction including a pipe, a fitting, and a bushing, each formed from polybutylene and providing a fluid-tight connection between the pipe and the fitting. The bushing is mounted about the pipe and an end of the pipe and the bushing is inserted into the fitting. The bushing is rotated with respect to the fitting to produce friction welds between the bushing and both the pipe and the fitting.

In preferred embodiments of the present invention, the bushing is telescopically mounted on the pipe and the pipe and bushing form interference fit, telescopic joints with respect to the fitting. The fitting is formed with internal steps which serve as abutments for the ends of the pipe and the bushing. The end of the bushing inserted within the fitting is tapered, and the external surface of the bushing includes projections to assist in engagement by a means for rotating the bushing while in an inteference fit with respect to the fitting.

A preferred method of assembling the pipe, bushing and fitting components would include initially inserting the bushing onto the pipe and then the pipe into the fitting and then securing the fitting against rotation. The bushing is next slid along the pipe into the fitting. The tool for rotating the bushing engages the exterior surface of the bushing and rotates it until the friction welds are sensed.

Other objects and advantages of the present invention will be apparent from the following detailed description of preferred embodiments when considered in conjunction with the accompanying drawings.

DETAILED DESCRIPTION OF THE DRAWINGS

Figure 1:
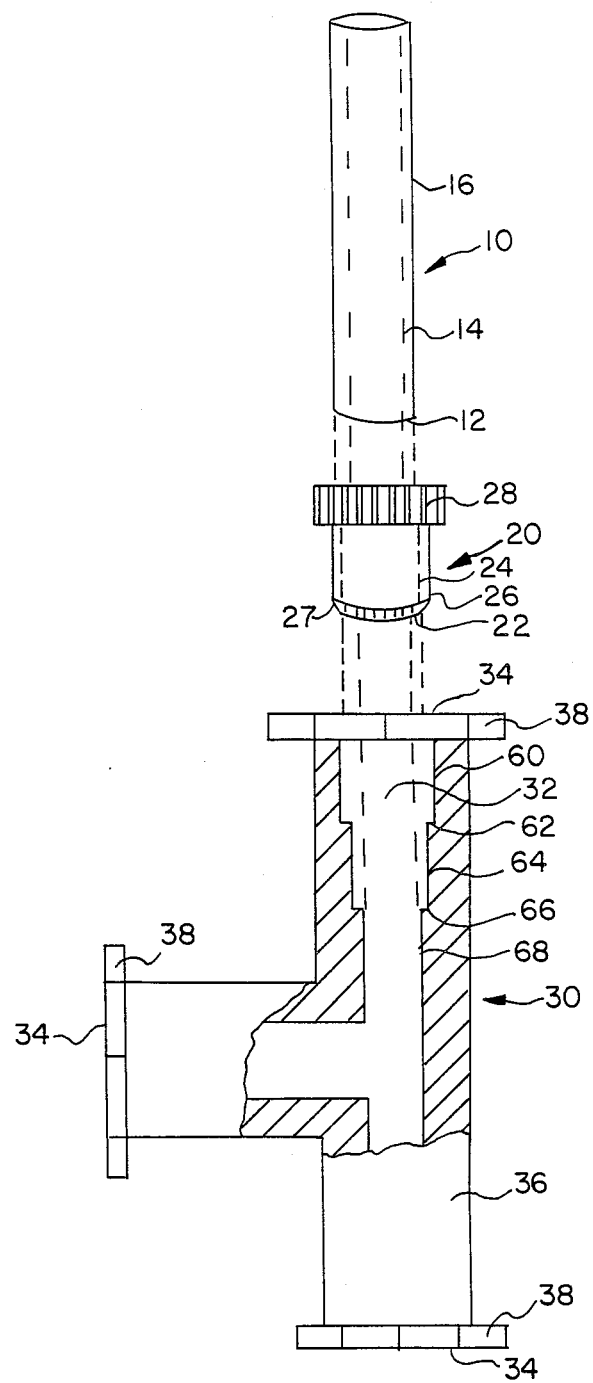
FIG. 1 is an exploded view of connection components according to the present invention with a partial cross-sectional view of the fitting.

FIG. 1, which illustrates a preferred embodiment of the present invention, shows an exploded view of a plumbing connection having a pipe or tube 10 for fluid flow, a bushing 20, and a fitting or fixture 30 for fluid-tight connection to pipe 10. All three of these components are preferably made from polybutylene materials. The present invention provides a means of forming such a tubular connection using only polybutylene components.

Briefly, bushing 20 is mounted about pipe 10 by inserting end 12 of pipe 10 into and through central passageway 24 of bushing 20. End 12 of pipe 10 and end 22 of bushing 20 are inserted into passageway 32 of fitting 30. Bushing 20 is rotated within passageway 32 so as to create friction welds at surface interfaces 40 and 50, as shown in FIG. 2.

Pipe 10 forms a fluid flow tube or conduit having an inner passageway 14 therethrough and an exterior surface 16. When polybutylene materials are used, pipe 10 is, for example, formed by extruding the plastic material. One of the advantages of the present invention is that it can be employed with pipes of any desired length.

Bushing 20 forms a sleeve which is mounted over exterior surface 16 of pipe 10 and includes a central passageway 24 therethrough and an exterior surface 26. End 22 of bushing 20 preferably includes a taper 27 from the diameter of exterior surface 26 of bushing 20 down to the diameter of central passageway 24. Exterior surface 26 also includes a portion 28 with an irregular surface configuration, having, for example, an enlarged diameter with a plurality of projections circumferentially spaced about that enlarged diameter. Bushing 20 is also preferably extruded or molded from polybutylene materials.

Figure 2:
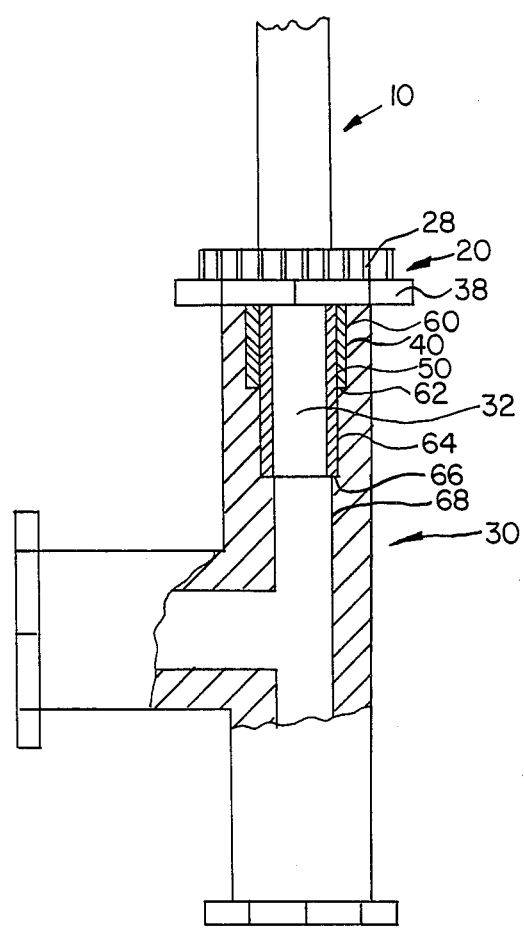
FIG. 2 is a partial cross-sectional view of an assembled connection according to the present invention and corresponding with the view of FIG. 1.

Fitting 30 is shown in FIGS. 1 and 2 as a T connector for three pipe segments. It should be readily understood from the present disclosure that the principles of the present invention may likewise be applied to elbows or J connections or other plumbing fixtures and fittings. As shown, fitting 30 includes central passageway 32 between openings 34. Although the details of passageway 32 with respect to only one opening 34 are shown, the present invention contemplates that each opening 34 can include a similar arrangement, as where additional pipe connections are desired. Again, fitting 30 is preferably molded from polybutylene materials. Fitting 30 is further shown to include flanges 38 on exterior surface 36 of fitting 30. As will now be understood by those skilled in the art, these flanges may be of hexagonal circumferential configuration such that a wrench-like tool can be used with fitting 30. However, the present invention specifically contemplates embodiments wherein fitting 30 does not include flanges 38.

Passageway 32 preferably includes three different regions of circumferential diameters. Region 60 is defined between opening 32 and step 62. Region 64 is defined between step 62 and step 66. Region 68 is defined between step 66 and the junction of the passageways extending from each opening 32. The diameter of region 60 is approximately the same as the diameter of exterior surface 26 of bushing 20. The diameter of region 64 is approximately the same as the diameter of exterior surface 16 of pipe 10. The diameter of region 68 is at least as large as the diameter of passageway 14 of pipe 10. In especially preferred embodiments, an interference fit is provided by forming the diameter of regions 60 and 64 slightly less than the diameter of exterior surfaces 26 and 16, respectively. For example, the diameter of region 60 may be 0.005 inch less than the diameter of exterior surface 26 of bushing 20.

Steps 62 and 66 in passageway 32 are formed as radially inward extensions of the interior passageway surface and serve as abutment stops for ends 22 and 12, respectively. Although two discrete stops are shown in fitting 30, the present invention contemplates that the distance along passageway 32 between steps 62 and 66 may be minimized where it is not desired to have pipe 10 extend into fitting 30 beyond bushing 20. Further, even where pipe 10 is to extend beyond bushing 20 within fitting 30, in certain embodiments of the present invention one or both of steps 62 and 66 can be omitted.

The method of assembling pipe 10, bushing 20 and fitting 30 into a fluid-tight connection which will withstand high fluid pressures even for sustained periods of time and over a wide range of temperatures includes forming friction welds between the interior surface of passageway 32 and exterior surface 26 of bushing 20 and between the interior surface of passageway 24 and exterior surface 16 of pipe 10. To achieve these welds simultaneously, pipe 10 is inserted into passageway 24 of bushing 20 so as to form a telescopic joint between pipe 10 and bushing 20. Pipe 10 is then inserted through opening 34 and into passageway 32 until end 12 of pipe 10 abuts step 66, thus forming a telescopic joint between pipe 10 and fitting 30. In especially preferred embodiments of the present invention, pipe 10 forms an interference fit with fitting 30 over region 64.

Bushing 20 is then also inserted through opening 34 and into passageway 32 at region 60 by sliding along exterior surface 16 of pipe 10 until end 22 of bushing 20 abuts step 62. Thus, a telescopic joint is formed between bushing 20 and fitting 30. Taper 27 reduces resistance to insertion of bushing 20 into fitting 30 especially where an interference fit is obtained over region 60. Portion 28 of bushing 20 is not inserted into fitting 30 so that the irregular surface and projections thereon remain exposed. The present invention contemplates that bushing 20 may be inserted into fitting 30 sequentially or simultaneously with respect to pipe 10.

When pipe 10 and bushing 20 are so inserted into fitting 30, the interior surface of passageway 32 at region 60 and exterior surface 26 of bushing 20 form a surface interface 40. Likewise, the interior surface of passageway 24 and exterior surface 16 of pipe 10 form a surface interface 50. Also, since the diameter of region 68 is at least as large as the diameter of passageway 14 of pipe 16, the connection of pipe 10 to fitting 30 does not present a fluid flow constriction at the fitting.

To provide friction welds at surface interfaces 40 and 50, bushing 20 is rotated with respect to fitting 30 and, in preferred embodiments of the present invention, also with respect to pipe 10. For example, an apparatus releasably engages bushing 20 from the side and at portion 28 and rotates it at 1800–2500 rpm for 5–8 seconds to simultaneously form fluid-tight friction welds at both surface interfaces 40 and 50 in the common joint. Where bushing 20 is interference fit with respect to pipe 10 and/or fitting 30, a certain amount of torque is required to rotate bushing 20 sufficiently. For example, it has been found that with embodiments having a 0.005 inch interference fit, 9 foot-pounds of torque is appropriate. Tests have shown that such polybutylene fitting connections according to the present invention have remained fluid-tight up to 500 psi.

The present invention contemplates that bushing 20 may be rotated at significantly slower speeds to obtain the friction welds, although a longer time period would be required. The apparatus for rotating bushing 20 is typically provided with a feedback sensor for detecting the friction welds and shutting off rotational force. Alternatively, a timer can shut off rotational force when it is calculated that, for a given construction, the friction welds should be present.

The friction welds at surface interfaces 40 and 50 are believed to form a superior fluid-tight seal and bond for pipe 10, bushing 20 and fitting 30 because under the rotation of bushing 20 fibrous interconnections of polybutylene material of each of these three elements are formed and fused together. Thus, the present invention provides a full flow joint without restrictions in the flow path.

Although the invention has been described in terms of detailed preferred embodiments, it is to be understood that this description is to be taken by way of illustration and example only, and not by way of limitation. For example, other alternative shapes and structures may be employed in the assembly. Accordingly, the spirit and scope of the invention is to be limited only by the terms of the appended claims.

What is claimed is:

1. A tubular connection construction comprising:
   a tube member,
   a bushing means having inner and outer surfaces mounted about said tube member,
   a connection member having an opening into which an end of said tube member and an end of said bushing means are inserted,
   said bushing means including a rotatable portion extending out of said opening,
   said bushing means forming separate, coaxial and substantially concentric friction welds substantially simultaneously with respect to both said connection member and said tube member when said bushing means is rotated with respect to said tube member and said connection member, each of said friction welds being formed substantially simultaneously over the length of that weld, and
   said tube member, bushing means and connection member are each formed from polybutylene materials.

2. The tubular construction according to claim 1 wherein said tube member is a fluid flow pipe, said connection member is a plumbing fitting, and said construction forms a plumbing connection for fluid flow therethrough.

3. The tubular construction according to claim 1 wherein said connection member includes a first internal step means for abutment against said end of said tube member and a second internal step means for abutment against said end of said bushing means when said tube member and said bushing means are received within said connection member.

4. The tubular construction according to claim 3 wherein said second internal step includes an abutment face, and said end of said bushing means is tapered with respect to said face of said second internal step.

5. The tubular construction according to claim 3 wherein the internal diameter of said connection member receiving fluid flow when said tube member and said bushing are received within said connection member is at least as large as the internal diameter of said tube member such that flow through said connection member is not restricted with respect to flow through said tube member.

6. The tubular construction according to claim 1 wherein the outside diameter of at least a portion of said bushing means received within said connection member is larger than the inside diameter of at least a portion of said connection member receiving said bushing means such that said bushing means and said connection member form an interference fit.

7. A plumbing construction comprising:
   a polybutylene tubing element,
   a polybutylene fitting element,
   a polybutylene bushing element, said bushing element forming telescopically fitted joints with respect to each of said tubing element and said fitting element, these two joints being secured together by first and second fluid-tight, separate coaxial and substantially concentric friction welds formed substantially simultaneously by rotation of said bushing element with respect to said tubing element and said fitting element, and
   said first and second friction welds being formed over first and second lengths of said bushing element, respectively, and the formation of each of said friction welds being substantially simultaneous over the length of that weld.

8. The plumbing construction according to claim 7 wherein said friction welds result over concentric portions of said tubing element, fitting element, and bushing element surfaces.

9. The plumbing construction according to claim 7 wherein said bushing element includes an exterior surface and projecting means, on said exterior surface, for assisting in rotatable engagement of said bushing element by means for rotating said bushing element.

10. The plumbing construction according to claim 7 wherein said tubing element and said fitting element form a third telescopically fitted joint with respect to each other.

11. A tubular connection between a polybutylene pipe member and a polybutylene fitting formed by the method comprising:
   mounting a polybutylene bushing member about the exterior circumference of said pipe member,
   disposing an end of said pipe member and an end of said bushing member within an opening in said fitting such that a rotatable portion of said bushing extends out of said opening, and then
   rotating said bushing member with respect to said fitting and said pipe member at a sufficient speed and for a sufficient period of time to form separate fluid-tight substantially concentric and coaxial friction welds between said bushing member and each of said pipe member and said fitting.

12. The tubular construction according to claim 11 wherein prior to rotating said bushing member, an interference fit is formed between said bushing member and each of said pipe member and said fitting.

13. The tubular construction according to claim 11 wherein said pipe member, said bushing, and said fitting are formed from polybutylene such that said friction welds result in fibrous interconnection between polybutylene material of said pipe member, said bushing and said fitting.

14. A method of forming a sealed, tubular connection between a polybutylene tubular member and a polybutylene fitting member comprising the steps of:

mounting a polybutylene bushing element about said tubular member, disposing an end of said tubular member and an end of said bushing element within an opening in said fitting member such that a rotatable portion of said bushing element extends out of said opening, and rotating said bushing element with respect to said fitting member and said tubular member so as to form coaxial and concentric separate friction welds substantially simultaneously between said bushing element and each of said tubular member and said fitting member.

15. The method according to claim 14 wherein said bushing element is slidably mounted on said tubular member, said tubular member is first disposed within said fitting member and said bushing element then disposed within said fitting member by sliding motion with respect to said tubular member.

16. A plumbing construction comprising:

a fluid conduit;

a bushing having a generally cylindrical portion overlaying and engaging said fluid conduit at one end thereof, said bushing also including an enlarged flange;

a fitting having at least one opening therein, said end of said fluid conduit and said cylindrical portion extending within said opening with said enlarged flange and the other end of said conduit being outside of said opening, and said fluid conduit, bushing and fitting being disposed within said opening such that rotation of said enlarged flange with respect to said fluid conduit and said fitting results in the formation of separate fluid-tight, substantially concentric friction welds between said fluid conduit, bushing and fitting, and said separate friction welds being formed substantially simultaneously by said rotation.

* * * * *

UNITED STATES PATENT AND TRADEMARK OFFICE
CERTIFICATE OF CORRECTION

PATENT NO. : 4,784,409

DATED : November 15, 1988

INVENTOR(S) : James T. Piechowiak

It is certified that error appears in the above-identified patent and that said Letters Patent is hereby corrected as shown below:

In column 1, line 41 please delete "portable" and insert therefor --potable--.

In claim 9, line 3 please delete "projecting" and insert therefor --projection--.

In claim 14, line 12 please insert --separate-- before "coaxial" and delete "separate" after "concentric".

Signed and Sealed this

Eighteenth Day of April, 1989

Attest:

DONALD J. QUIGG

Attesting Officer

Commissioner of Patents and Trademarks